(12) United States Patent
Sullivan et al.

(10) Patent No.: US 6,233,459 B1
(45) Date of Patent: May 15, 2001

(54) SYSTEM FOR PROVIDING GEOLOCATION OF A MOBILE TRANSCEIVER

(75) Inventors: Mark Sullivan, Annandale; Joseph Kennedy, Great Falls; Scott Francis, Centreville, all of VA (US)

(73) Assignee: The Atlantis Company, Limited, Japan, Tokyo (JP)

( * ) Notice: Subject to any disclaimer, the term of this patent is extended or adjusted under 35 U.S.C. 154(b) by 0 days.

(21) Appl. No.: 09/040,917

(22) Filed: Mar. 18, 1998

Related U.S. Application Data
(60) Provisional application No. 60/043,956, filed on Apr. 10, 1997.

(51) Int. Cl.[7] .................................................. H04Q 7/20
(52) U.S. Cl. .......................... 455/456; 455/562; 375/149; 342/357.1
(58) Field of Search ..................................... 455/456, 562, 455/422, 561, 67.6; 342/457, 357.1, 357.06, 357.12; 7/357.08; 375/149

(56) References Cited

U.S. PATENT DOCUMENTS

| | | | |
|---|---|---|---|
| 4,728,959 | 3/1988 | Maloney et al. | 342/457 |
| 4,845,504 * | 7/1989 | Roberts | 342/457 |
| 4,891,650 | 1/1990 | Sheffer | 342/457 |
| 5,056,106 * | 10/1991 | Wang et al. | 342/450 |
| 5,218,618 | 6/1993 | Sagey | 375/1 |
| 5,317,323 | 5/1994 | Kennedy et al. | 342/457 |
| 5,327,144 | 7/1994 | Stilp et al. | 342/387 |
| 5,365,544 | 11/1994 | Schilling | 375/1 |
| 5,404,376 | 4/1995 | Dent | 375/200 |
| 5,506,864 | 4/1996 | Schilling | 375/205 |
| 5,508,708 | 4/1996 | Ghosh et al. | 342/457 |
| 5,512,908 | 4/1996 | Herrick | 342/387 |
| 5,515,419 | 5/1996 | Sheffer | 379/58 |
| 5,519,760 | 5/1996 | Borkowski et al. | 379/59 |
| 5,592,180 * | 1/1997 | Yokev et al. | 342/342 |
| 5,675,344 | 10/1997 | Tong et al. | 342/457 |
| 5,736,964 | 4/1998 | Ghosh et al. | 342/457 |
| 5,914,687 * | 6/1998 | Rose | 342/442 |
| 5,945,948 * | 8/1999 | Buford et al. | 342/457 |
| 5,970,413 * | 10/1999 | Gilhousen | 455/456 |

\* cited by examiner

Primary Examiner—William G. Trost
Assistant Examiner—Tilahun Gesesse
(74) Attorney, Agent, or Firm—Laff, Whitesel & Saret, Ltd.

(57) ABSTRACT

A method and means for locating a transceiver remote from a base station operating in a spread spectrum mode, including determining the angle of arrival of a remote emission from the transceiver and the range of the remote emission and then calculating the geolocation of the remote transceiver therefrom.

16 Claims, 2 Drawing Sheets

SYSTEM FOR PROVIDING GEOLOCATION OF A MOBILE TRANSCEIVER

This is a formal application which replaces provisional application Ser. No. 60/043,956, filed Apr. 10, 1997.

BACKGROUND OF THE INVENTION

Cellular mobile radio systems are well known. Such systems use a plurality of base stations for broadcasting signals to and maintaining voice and or data communications with mobile radio equipment. Such mobile radios may include automobile carried cellular mobile telephones, portable cellular telephones, pagers, dispatch, and/or data link radios, and a variety of other RF broadcasting equipment that are remote from a central system. Most such radios, which in essence are actually transceivers in that they are typically enabled to both broadcast and receive, are individually identified by a code or call number. Once turned on, each radio transmits an identifying signal that includes the code so that the radio may be contacted if a call is directed to it. That is, the user of the radio does not have to be actively engaged in a communication on the radio for an identifying signal of that radio to be received by the base stations.

Cellular telephony and its related communications technologies has provided numerous benefits to users, including the ability to maintain contact with business associates, friends, and family, and the often critical ability to provide communications to request help and support in an emergency.

Over time, it has become increasingly apparent that the ability to locate the source of a cellular telephone call would be advantageous for a variety of reasons. Of paramount importance is the ability to locate an injured person or law enforcement officer in distress who has initiated a cellular call. Other advantageous reasons relate to locating the original source of an illegally operated cellular telephone.

A disadvantage of conventional systems is that that many are not passive in operation. In other words, some action by the user of the mobile radio may be needed to initiate or maintain tracking by a base station. For example, the user may have to initiate a special signal that may be detected and tracked. It is desirable that locating systems available to law enforcement not rely on initiating action by a mobile radio user.

Known techniques of locating a source of cellular telephone transmission are very similar to efforts directed to radio direction finding methods dating to the First World War. These techniques include triangulation methods where three or more receiving sites are enabled to receive a transmission and correspondingly triangulate a bearing based on the received signals.

Such methods lend themselves well to simple analog radio broadcasts, where a temporal lobe of broadcast power can be homed in upon. However, in cellular telephony, the science of providing the ability of packing more and more users into a finite radio frequency spectrum has created many roadblocks for locating one cellular telephone user out of the potentially thousands of users transmitting in an area at any one time. The rapidly advancing science directed to digital communications compounds matters still further.

For example, in accordance with a frequency division multiple access (FDMA) scheme, a spectral bandwidth of 1.2 MHz can be divided into 120 radio channels with a channel bandwidth of 10 kHz. In accordance with a time division multiple access (TDMA) scheme, a spectral bandwidth of 1.2 MHz can be divided into 40 radio channels with a radio channel bandwidth of 30 kHz, but with each radio channel carrying three time slots for a total of 120 time-slot channels. In a code division multiple access (CDMA) scheme, a spectral bandwidth of 1.2 MHz can be used as one radio channel but can provide 40 code-sequence traffic channels for each sector of a cell. In this scheme a cell of three sectors will have a total of 120 traffic channels. See, for example, *Electrical Engineering Handbook,* CRC Press, 1993, pages 1552–1553.

One can visualize that as far as channel efficiency is concerned, TDMA, FDMA, and CDMA can be used to provide the same number of traffic channels. However, in FDMA and TDMA, frequency reuse has to be applied.

Unlike FDMA and TDMA signaling systems where there is high likelihood that a mobile unit signal can be received from multiple dispersed sites, such as dispersed base stations, allowing triangulation through lines of bearing or TDOA hyperbolas, CDMA signal levels and co-channel cellular radio characteristics all require other geolocation techniques to guarantee high availability and accurate geolocation.

Further, the conventional triangulation techniques used as such in FDMA and TDMA systems for geolocating a cellular user cannot be adapted to reliably work for systems utilizing emerging CDMA air standards such as IS-95. See, *Mobile Radio Communications,* Steele, R., IEEE Press, 1992, pages 71–76, herein incorporated by reference.

Unlike the air standards applicable to TDMA and FDMA systems, IS-95 allows multiple users to share common frequency spectrum simultaneously, by assigning each system user a unique spread spectrum spreading code. In spread spectrum a modulation technique is used for multiple cellular subscriber access, or for increasing immunity to noise and interference.

A spread spectrum system makes use of a sequential noise-like signal structure, for example P.N. (pseudo-noise) codes, to spread the normally narrow band information signal over a relatively wide band of frequencies. The receiver correlates these signals to retrieve the original information signal. *Foundations of Mobile Radio Engineering,* Yacoub, CRC Press, 1993, pp. 401–7, here incorporated by reference.

Because a CDMA base station field of view might include thirty or more users not separable in time or frequency, another approach must be taken for reliably distinguishing each user for geolocation. Further, because IS-95 employs a frequency reuse factor of one, geolocation of mobiles must routinely be done from a single site rather than three, potentially adding additional complexity.

Because having an accurate time standard in relationship to the coded communications is of paramount importance to the integrity of a CDMA system, in at least one known system, a geo-synchronous satellite based time standard is utilized in conjunction with a broadcast pilot signal. *Steele,* p.71.

Accordingly, it would be advantageous to provide an method and system for determining the position of a mobile radio without requiring a multiplicity of receiving sites.

It would also be advantageous to provide a means for geo-locating the position of a spread spectrum radio frequency emission, such as a CDMA coded radio frequency emission.

It would also be very advantageous to provide an apparatus and method for locating the position of a CDMA cellular coded radio frequency emission in essentially real time.

SUMMARY OF THE INVENTION

In accordance with the present invention, an apparatus and method is provided for the geolocation of a remote or mobile radio transceiver without requiring-triangulation. The invention contemplates using the line of bearing (LOB) determined from the angle of arrival (AOA) of an emission from a remote transceiver and the determined times of emission and reception of the emission at the base station site to determine the range or distance of the remote transceiver from the base station. These determinations will serve to geolocate the remote transceiver.

A communications system in accordance with the present invention for providing geolocation of remote transceivers includes at least one mobile transceiver capable of spread spectrum coded radio frequency emission and communication with at least one base station. The base station is capable of spread spectrum coded radio frequency emission and communication. Each base station comprises at least one transmitter and at least one receiver having an antenna coupled thereto. The system further includes means for synchronizing each remote transceiver with a base station in time, a means for identifying a code of interest in a spread spectrum coded radio frequency emission received from a remote transceiver, a direction finding means for determining an angle of arrival of the spread spectrum coded radio frequency emission from the selected remote transceiver, determination means coupled to the direction finding means for determining a range between the remote mobile transceiver and the receiver, the determination means utilizing a propagation time of the identified code of interest, and means for calculating the geolocation of the remote transceiver using the determined angle of arrival of said spread spectrum coded radio frequency emission and the determined propagation time of the identified code of interest.

In a preferred form, the synchronizing means includes means for providing a time standard such as a GPS time standard, for synchronizing the base station and remote transceiver in time, and the identifying means comprises a despreader means coupled to the receiver. Desirably means for calculating the geolocation of the remote transceiver further comprises converter means for converting the radio frequency of the coded radio frequency emission to an IF signal and a digital signal processor. Desirably, an analog to digital converter for operatively coupling the converter means to the digital signal processor is provided. The spread spectrum coded radio frequency emission is desirably a CDMA emission.

Further objects, features and advantages of the present invention will become apparent from the following description and drawings.

DETAILED DESCRIPTION OF THE PREFERRED EMBODIMENT

Figure 1:
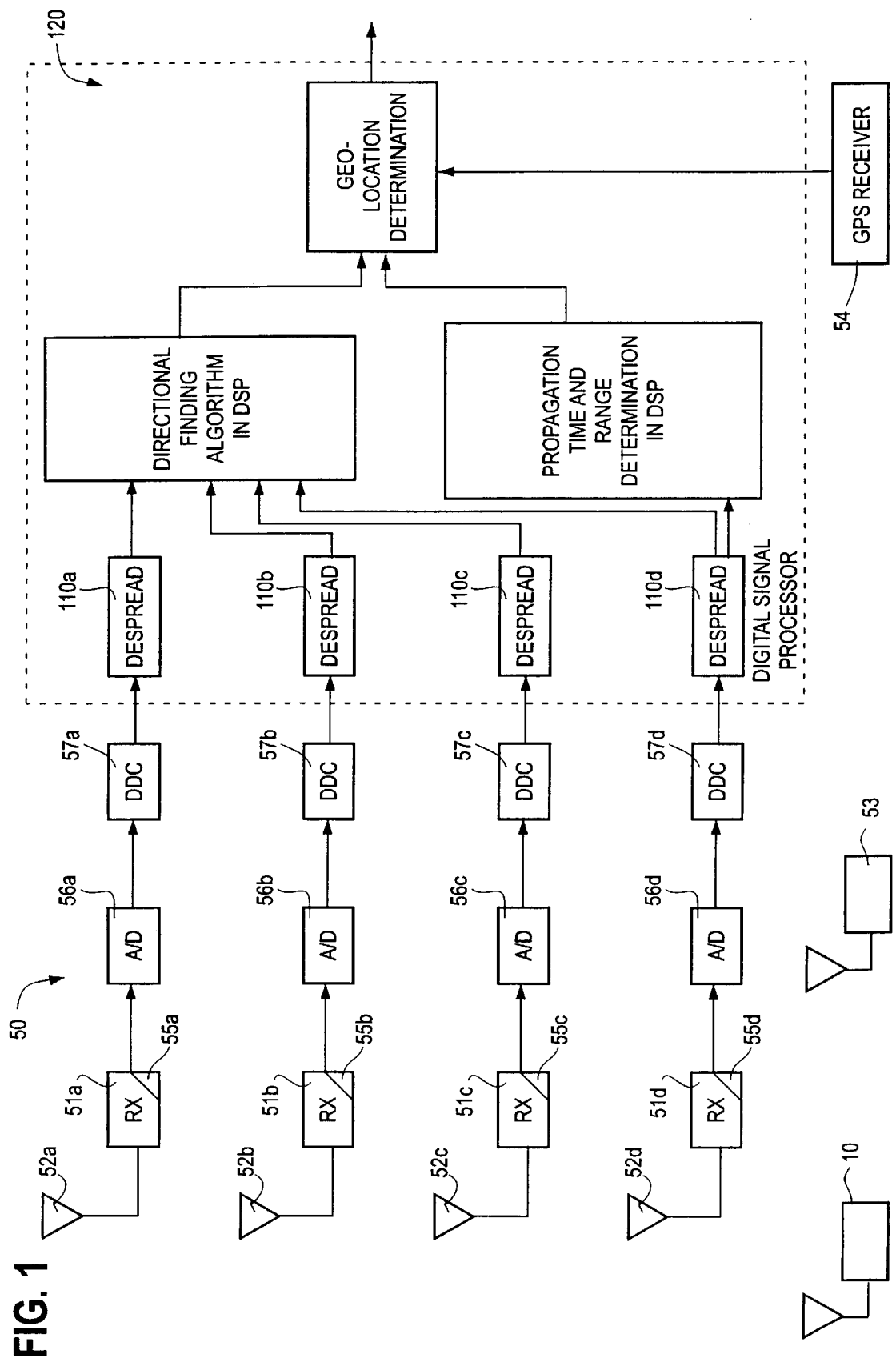
FIG. 1 shows a block diagram of a geolocation system in accordance with the present invention.

Referring now to the drawings, a communications system providing geolocation with the present invention includes a plurality of mobile transceivers 10 and one or more base stations 50. As used herein, the term mobiles and mobile transceivers are intended to be synonymous with the term remote transceivers, namely those remote from the base station, which transceivers may be portable or movable, as well as those which may be stationary, as for office use. In the preferred embodiment the system is a CDMA system and the mobile transceivers 10 and base stations 50 are operable in a CDMA mode. Other systems capable of operation in a spread spectrum coded radio mode may be used as well.

Each base station 50 has a plurality of receivers 51a, 51b, . . . , each having an associated antenna 52a, 52b, . . . coupled thereto, as well as one or more transmitters 53 and associated antennas. In the preferred embodiment, each base station 50 also provides a time standard for synchronizing the base station 50 and each mobile transceiver 10 in time; the time standard is desirably enabled by a global positioning system (GPS), such as that which is described in U.S. Pat. No. 5,317,323 herein incorporated by reference. Further, each base station 50 has means for receiving and utilizing the time standard thereby to synchronize the base station 50 and mobile transceiver 10 in time. In the preferred embodiment, this receiving means is a GPS receiver available as part #36204-61 from Trimble Navigation, 845 North Mary Ave., P.O. Box 3642, Sunnyvale, Calif. 94088.

Each base station 50 further provides a plurality of despreaders 110a, etc., one coupled-to each receiver 51a, etc. for identifying a code of interest in a spread spectrum coded RF signal or emission received from a mobile transceiver 10. The despreaders may be implemented in a digital signal processor in software as in accordance with the description in *Foundations of Mobile Radio Engineering,* Yacoub, supra at pp. 405–7. The despreaders 101a, etc. serve to enhance the signal power level from the mobile transceivers of interest so that direction finding techniques, such as those provided by an Alternating Projection Method (APM) algorithm described below, may provide accurate signal angle of arrival (AOA) calculations.

To determine the location of a mobile transceiver 10, the system of the present invention provides means for determining the bearing of the mobile transceiver 10 relative to the base station receivers 51a, etc., as well as the range or distance of the mobile transceiver 10 to the base station receiver. In accordance with the present invention, the direction is preferably determined from a single base station 50.

As illustrated in FIG. 1, a digital signal processor (DSP) 120 determines an angle of arrival of the spread spectrum coded RF emission from a mobile transceiver 10, as via a direction finding algorithm processed in the DSP, thereby serving as a direction finding means. The digital signal processor may be a multichannel wideband digital signal processor. Multiple channels of the frequency band allocated for the services may be coherently block converted from radio frequency analog signals to a digital format in a manner that preserves a very high dynamic range. Digital signal processors may then be employed to geolocate each user of interest. The digital signal processor 120 also serves as a determination means for determining the range of a mobile transceiver 10 of interest from a base station 50. It uses a propagation time of the emitted identified code of interest between the mobile transceiver 10 and the base station 50 to establish the range.

The digital signal processor 120 then calculates the location of the mobile transceiver 110 using the determined angle of arrival of the received CDMA emission and the determined propagation time of the identified code of interest of the CDMA emission.

In a preferred form the radio frequency of the coded radio frequency emission received by receivers 51a, etc. is converted to an IF frequency of 19.2 Mhz by block RF to IF downconverters 55a, etc. Downconverters 55a are coupled to corresponding independent A/D converters 56a. Independent A/D converters 56a, etc. (such as Analog Devices AD9042 available from Analog Devices, One Technology Way, P.O. Box 9106, Norwood, Mass. 02062) sample and quantize each of the corresponding IF signals in accordance with conventional CDMA practice.

The outputs of the A/D converters 56a, etc. are connected to the DSP 120 through digital down converters 57a, etc. (available from Harris, 1503 South Coast Dr., Suite 320, Costa Mesa, Calif. 92626). A suitable DSP 120 is Analog Devices ADSP21060. The DSP 120 executes the despreading, direction finding (DF) through a direction finding algorithm, and ranging calculations to produce geolocations corresponding to the received and processed CDMA coded radio frequency transmissions received from mobile transceivers 10. The geolocations may be recomputed periodically depending upon the use to which the system is to be put. If its purpose is to continuously track mobile users in motion, then recomputations can be made as frequently as, for example, every second or even more frequently.

The present system provides a novel procedure for geolocating a spread spectrum transceiver, such as a CDMA transceiver. It permits the use of a single base station 50 to fix the location of a mobile emission. It does not require triangulation. Instead, it determines both the angle of arrival and the range to perform the geolocation.

The range is determined from the difference in the transmit time or emission time and receive time of some known feature, such as a pseudo-random code in the CDMA emission. A transmit time reference subsystem, such as a GPS receiver 54, is used in the preferred embodiment in accordance with the CDMA timing reference used in IS-95. Depending upon the spread spectrum system used, the transmit timing subsystem 54 may simply measure the timing of the transmitted signals directly using a spread spectrum receiver. The receiver may measure the timing of the pseudo-noise signal transmitted by the base station transmitter 53 in exactly the same fashion it is used to measure the signal from a mobile transceiver 10. Both the emission time and receive time are ultimately provided to the DSP 120 which calculates the range by dividing the time difference by the speed of light. This then is divided by 2 to identify the range.

$$r = \{(t2-t1) \cdot c\}/2$$

where t1 is the measured transmit time, t2 is the measured receive time, and c is the speed of light.

Although the angle of arrival and time difference between the transmission and receipt of the emission are determined separately, both use the despreader outputs. The time of arrival is determined by the code phase of the despreading sequence, and the angle of arrival is determined from a direction-finding algorithm operating on the despreader outputs.

Figure 2:
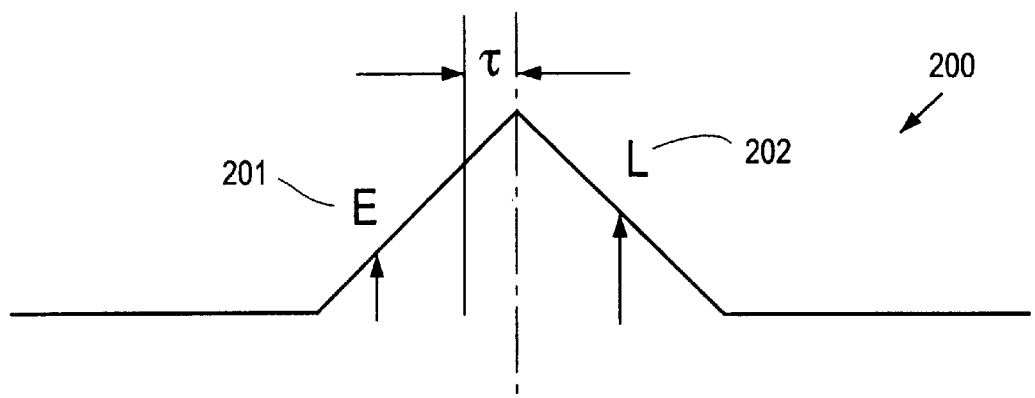
FIG. 2 shows an idealized correlation output in accordance with the invention.

The principle of the despreader operation is illustrated in FIG. 2. There the triangular wave form 200 represents the idealized correlator output as a function of time offset between the received signal spreading code phase and the local code phase at the despreaders.

This time offset is calculated by using a pair of additional correlators, an Early (E) correlator 201, and a Late (L) correlator 202 in addition to the correlators (not shown) used to actually despread the signal at despreaders 101a–d.

At each signal interval, the recited correlators will produce a set of three (complex-valued) outputs. The despreader correlator 110a–d is used to provide phase measurements for angle estimation, and the outputs of correlators 201, 202, respectively, are used to compute a time offset estimate according to $$\hat{\tau} = g\left(\frac{|E|^2 - |L|^2}{|E|^2 + |L|^2}\right),$$

where g( ) is a function that inverts $h(t) = r_c^2(t-\Delta) - r_c^2(t+\Delta)$, $r_c(t)$ is the chip wave form autocorrelation function, and $\Delta$ is the time offset between the E or L correlators and the despreader correlator 110a–d. By averaging $\hat{t}$ across many signals, a very precise estimate of the time offset between the received code phase and the local despreader code phase can be computed.

The range estimate may be calculated from a comparison of the CDMA spreading code timing at the base station 50 and that of the mobile transceiver 10. The timing is derived from the difference between the phases of the CDMA spreading sequences at the base station 50 and at the mobile transceiver 10.

In the preferred embodiment, the transmitted spreading code phase is specified as a function of absolute time of day, so that the invention can optionally determine the time of transmission without measurements at all so long as an accurate source of absolute time, such as GPS, is available.

The difference between the time that the spreading code sequence was sent and when a particular spreading code sequence was received from the mobile transceiver 10 reflects the propagation time and a fixed delay in the emission from the mobile transceiver 10. The distance to the mobile 10 is calculated by subtracting the fixed delay from the time difference and then dividing the result by two. This yields a value of the one-way propagation delay from the base station 50 to the mobile user 110. Multiplying the one-way propagation delay by the speed of light gives the range r from the base station 50 to the mobile user 110.

One procedure for determining the angle of arrival is following the angle of arrival determination algorithm which is based on an Alternating Projection algorithm. A feature of this particular algorithm is that it is able to resolve complex multipath components of a received signal. For a discussion of signal multipath problems related to cellular radio, see *Foundations of Mobile Radio Engineering,* Yacoub, supra at pp. 128–168.

In accordance with the angle of arrival determination algorithm, let X be the p by N matrix containing the measured outputs $x_i(t_k)$ of the despreaders indexed by I=1 . . . p at symbol times $t_k$, k=1 . . . N:

$$X = \begin{bmatrix} x_1(t_1) & x_1(t_2) & \cdots & x_1(t_N) \\ x_2(t_1) & x_2(t_2) & & \\ \vdots & & \ddots & \\ x_p(t_1) & & & x_p(t_N) \end{bmatrix}$$

The p by p sample covariance matrix R is then computed as $R = XX^H$, where $X^H$ denotes the Hermitian transpose of X.

An iterative procedure is used to determine a set of q angles θ, for I=1 . . . , q At each iteration a different angle $\theta_n$ is refined as follows. First of all, the p by q matrix A is constructed from the antenna array response vectors a ($\theta_i$) for I=1, . . . , q according to $$A = \begin{bmatrix} a_1(\theta_1) & a_1(\theta_2) & \cdots & a_1(\theta_q) \\ a_2(\theta_1) & a_2(\theta_2) & & \\ \vdots & & \ddots & \\ a_p(\theta_1) & & & a_p(\theta_q) \end{bmatrix}$$

Next, a new matrix A(n) is generated by deleting the $n^{th}$ column of A. This new matrix is then employed to compute a projection matrix P(n) defined by $$P(n)=A(n)(A^H(n)A(n))^{-1}A^H(n).$$

Now define the unit-norm steering vector b($\theta$, n) as $$b(\theta, n) = \frac{(I - P(n))a(\theta)}{\|(I - P(n))a(\theta)\|}.$$

The refined value of $\theta_n$ is then given by the value of $\theta$ that maximizes the real, scalar valued function f($\theta$) given by $$f(\theta)=b^H(\theta, n)Rb(\theta, n).$$

The procedure for finding the set of angles of arrival of a received signal is summarized as follows:
1. Measure despreader outputs for N symbol times and place the results in a matrix X.
2. Start by assuming there is only a single signal component present (i.e. no multipath) by setting q=1.
3. Define n=1, P(1)=I and solve for $\theta_1$ by maximizing fi ($\theta$).
4. Find $S=(A^H A)^{-1}AX$.
5. Evaluate $\|X-AS\|_F$ where F denotes the Frobenius norm. If this quantity drops below a threshold, jump to step 10.
6. Increment q (the number of signal components detected)
7. Solve for $\theta_n$ by maximizing f($\theta$) for n=q, . . . , 1.
8. Repeat step 7 until the values of $\theta_n$ converge.
9. Go back to step 4.
10. Select the angle $\theta_n$ associated with the row of S having the greatest mean-squared value. This is the relative angle of arrival.

Figure 3:
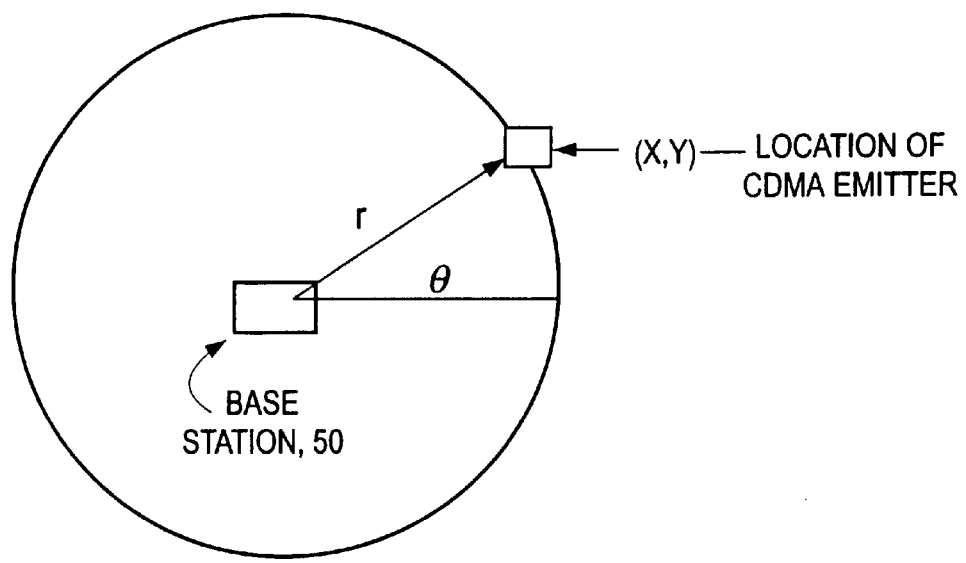
FIG. 3 illustrates a calculation method including angle of arrival and ranging.

The actual geolocation may now be calculated as follows. The position of the emitter may be computed as in the intersection of the angle of arrival with the range estimate, using the following formula:

$$(x,y)=(x_0+r \cos \theta + y_0 + r \sin \theta)$$

where the coordinates of the base station are given by ($x_o,y_o$), and $\theta$ is the computed angle of arrival. FIG. 3 illustrates the method recited.

In accordance with the present invention, an improved method and system for geolocating a source of radio emission, such as an emission in a CDMA cellular/PCS network, is provided. Single site geolocation is enabled by employing a direction finding technique with a range determination. The method and system can provide geolocation using measurements from only a single site to which the mobile emitter is assigned or data from multiple sites, if available. When used with a CDMA or other spread spectrum system, the system exploits the fact that the mobile transmitter synchronizes the timing of its spreading code to a spread spectrum signal sent by the base station. The propagation time can thus be measured by comparing the phase of the transmitted spread spectrum signal to the spreading code phase of the incoming signal from the mobile emitter.

The time delay between these code sequences reflects the time required for the signal to propagate to the mobile emitter plus the time required for the signal from the mobile emitter to return to the base station. Dividing this time interval by two and multiplying the result by the speed of light thus yields the range from the base station to the mobile emitter. Like geolocation can also be performed using either the control codes which emanate from the mobile for registration, call setup and system housekeeping, or on the voice codes which carry user voice/data. The mobile 10 must maintain time coherency with the base station 50 for the ranging scheme to be applicable, as a result of which the mobile transceivers 10 must be synchronized in time to the base station transmission so that the round-trip propagation time or one-way transmission time will be meaningful for calculating the range.

Further, a direct line of sight receipt of the mobile emission is highly desirable to provide an accurate angle of arrival to be used in the geolocation calculation. If a direct line of site or ray is not available, it may not be possible to accurately geolocate a user from a single base station. If a direct ray is not available, it would be advantageous to employ two or more base stations 50 to increase the chances that at least one will have a direct ray available. If no direct ray is available, geolocation is still feasible with conventional time difference of arrival techniques as long as three or more sites are within range.

It will be apparent to those skilled in the art that modifications may be made without departing from the spirit and scope of the invention. Accordingly, it is not intended that the invention be limited except as may be necessary in view of the appended claims.

What is claimed is:

1. In a communications system including at least one mobile transceiver capable of spread spectrum coded radio frequency emission and communication with at least one base station, said base station capable of spread spectrum coded radio frequency emission and communication, each said base station having at least one transmitter and at least one receiver having an antenna coupled thereto, a system for providing geolocation of a selected mobile transceiver, said system comprising:

means for synchronizing each mobile transceiver and each said base station in time;

a means for identifying a code of interest in a spread spectrum coded radio frequency emission received from a mobile transceiver;

a direction finding means for determining an angle of arrival of said spread spectrum coded radio frequency emission from said selected mobile transceiver wherein said direction finding means includes a digital signal processor for calculating the angle of arrival of a radio frequency emission from a mobile transceiver from antenna array response vectors associated with said radio frequency emission received from said mobile transceiver;

determination means coupled to said direction finding means for determining a range between said selected mobile transceiver and said receiver, said determination means utilizing a propagation time of the identified code of interest wherein the determination means determines the range between a mobile transceiver and a base station in accordance with:

$$r=\{(t2-t1)*c\}/2$$

where t1 is the measured transmit time, t2 is the measured receive time, and c is the speed of light; and means for calculating the geolocation of said mobile transceiver using the determined angle of arrival of said spread spectrum coded radio frequency emission and the determined propagation time of the identified code of interest.

2. The system of claim 1 and wherein said synchronizing means includes means for providing a time standard for synchronizing said base station and said mobile transceivers in time.

3. The system of claim 2, and wherein said means for providing a time standard comprises a GPS receiver.

4. The system of claim 1, and wherein said identifying means comprises a despreader means coupled to said receiver.

5. The system of claim 4, and wherein said direction finding means is coupled to said receiver.

6. The system of claim 1, wherein said means for calculating the geolocation of said mobile transceiver further comprises converter means for converting the radio frequency of said coded radio frequency emission to an IF signal.

7. The system of claim 6, wherein said means for calculating the geolocation of said mobile transceiver further comprises a digital signal processor.

8. The system of claim 7, further comprising an analog to digital converter for operatively coupling said converter means to said digital signal processor.

9. The system of claim 1, wherein the means for calculating the geolocation of said spread spectrum radio frequency emission calculates said geolocation in accordance with $$(x, y) = (x_0 + r\cos\theta + y_0 + r\sin\theta)$$

where (x,y) is the location of the source of emission.

10. The system of claim 1, wherein said mobile transceiver and base station are capable of CDMA communications.

11. A method of geolocating mobile transceivers in a communications system including at least one mobile transceiver capable of emitting a coded radio frequency and of communication and at least one base station capable of recognizing said coded radio frequency signal and of communication, each said base station having at least one transmitter and at least one receiver, each said base station and each said mobile transceiver being synchronized in time, a method for providing geolocation of a said mobile transceiver emitting a coded radio frequency signal, the steps comprising:

determining the time delay between the emission of said signal by said mobile transceiver and the reception of said signal by said base station;

calculating the range from said mobile transceiver to said base station utilizing the determined time delay of said emission and reception wherein the range is calculated in accordance with:

$$r = \{(t2-t1)*c\}/2$$

where t1 is the measured transmit time, t2 is the measured receive time and c is the speed of light;

determining an angle of arrival at the base station of said signal using an alternating projection algorithm; and determining the geolocation of said mobile transceiver utilizing the calculated range and the determined angle of arrival of said signal.

12. A method in accordance with claim 11, wherein said mobile transceiver and said base station are capable of emitting and recognizing spread spectrum coded radio frequency signals.

13. A method in accordance with claim 12, wherein said mobile transceiver and base station are capable of recognizing CDMA signals.

14. A communications system including at least one mobile transceiver capable of emitting a coded radio frequency signal and of communication and at least one base station capable of recognizing said coded radio frequency signal and of communication, each said base station comprising at least one transmitter and at least one receiver, each said base station and each said mobile transceiver being synchronized in time, means for providing geolocation of a said mobile transceiver emitting a coded radio frequency signal, said system comprising:

means for determining the time delay between the emission of said signal by said mobile transceiver and the reception of said signal by said base station;

means for calculating the range from said mobile transceiver to said base station utilizing the determined time delay of said emission and reception wherein the means for calculating calculates the range in accordance with:

$$r = \{(t2-t1)*c\}/2$$

where t1 is the measured transmit time, t2 is the measurer received time, and c is the speed of light;

phase interferometry means for determining an angle of arrival at the base station of said signal; and means for determining the geolocation of said mobile transceiver utilizing the calculated range and the determined angle of arrival of said signal.

15. A communication system in accordance with claim 14, wherein said mobile transceiver and base station are capable of spread spectrum coded radio frequency signal emission and reception.

16. A communication system in accordance with claim 15, wherein said mobile transceiver and base station are capable of CDMA coded radio frequency signal emission and reception.

* * * * *

UNITED STATES PATENT AND TRADEMARK OFFICE
CERTIFICATE OF CORRECTION

PATENT NO. : 6,233,459 B1
DATED : May 15, 2001
INVENTOR(S) : Sullivan et al.

It is certified that error appears in the above-identified patent and that said Letters Patent is hereby corrected as shown below:

<u>Title page,</u>
Item [73], delete "The Atlantis Company, Limited" and insert -- Allen Telecom Inc. --

<u>Column 4,</u>
Line 32, delete "101a" and insert -- 110a --
Line 64, delete "110" and insert -- 10 --

<u>Column 6,</u>
Line 2, delete "101a-d" and insert -- 110a-d --
Line 42, delete "110" and insert -- 10 --
Line 43, delete "10" and insert -- 10 --

<u>Column 8,</u>
Line 10, after "mobile", insert -- transceivers --

Signed and Sealed this

Second Day of April, 2002

Attest:

*Attesting Officer*

JAMES E. ROGAN
*Director of the United States Patent and Trademark Office*